(12) United States Patent
Machuletz et al.

(10) Patent No.: US 11,500,429 B2
(45) Date of Patent: Nov. 15, 2022

(54) INPUT SIGNAL COORDINATION AND METHOD FOR USE WITH AN EXPANSION MODULE

(71) Applicant: Rockwell Automation Germany GmbH & Co. KG, Wuppertal (DE)

(72) Inventors: Norbert Machuletz, Wuppertal (DE); Thomas Helpenstein, Wuppertal (DE); Oliver Heckel, Wuppertal (DE); Mussa Tohidi Khaniki, Wuppertal (DE); Jan Anslinger, Wuppertal (DE); Rudolf Papenbreer, Wuppertal (DE); Suresh R. Nair, Amherst, NH (US)

(73) Assignee: Rockwell Automation Germany GmbH & Co. KG, Wuppertal (DE)

(*) Notice: Subject to any disclaimer, the term of this patent is extended or adjusted under 35 U.S.C. 154(b) by 413 days.

(21) Appl. No.: 16/828,392

(22) Filed: Mar. 24, 2020

(65) Prior Publication Data

US 2021/0303037 A1 Sep. 30, 2021

(51) Int. Cl.
*G06F 1/18* (2006.01)
*G05B 19/05* (2006.01)
*G05B 19/042* (2006.01)

(52) U.S. Cl.
CPC ............ *G06F 1/18* (2013.01); *G05B 19/0428* (2013.01); *G05B 19/052* (2013.01); *G05B 2219/21014* (2013.01); *G05B 2219/21133* (2013.01)

(58) Field of Classification Search
CPC ...... G06F 1/18; G05B 19/0428; G05B 19/052; G05B 2219/21014; G05B 2219/21133
See application file for complete search history.

(56) References Cited

U.S. PATENT DOCUMENTS

| | | | | |
|---|---|---|---|---|
| 6,324,607 | B1* | 11/2001 | Korowitz | H01R 9/2658 710/63 |
| 10,197,985 | B2* | 2/2019 | Papenbreer | G05B 19/058 |
| 2004/0218317 | A1* | 11/2004 | Kawazu | G05B 19/058 361/1 |
| 2005/0267641 | A1* | 12/2005 | Nickerson | G05B 15/02 700/284 |
| 2008/0091932 | A1* | 4/2008 | McNutt | G05B 19/054 713/1 |
| 2010/0125344 | A1* | 5/2010 | Gaub | G06F 1/30 700/19 |
| 2016/0282911 | A1* | 9/2016 | Prosak | G05B 19/0428 |
| 2017/0285604 | A1* | 10/2017 | Al-Jandal | G06F 13/4282 |

* cited by examiner

*Primary Examiner* — Ronald D Hartman, Jr.
(74) *Attorney, Agent, or Firm* — Amin, Turocy & Watson, LLP

(57) ABSTRACT

An expansion module for an industrial controller is configured to perform independent local processing of its input signals and to independently generate control outputs in parallel with the primary control program executed by the industrial controller. This can reduce or eliminate response latency for time-critical processes that would otherwise be present if all monitoring and control were performed by the industrial controller alone. This approach can be beneficial for configurations in which the industrial devices that are monitored and controlled via the expansion module require fast response times, as in the case of industrial safety applications.

20 Claims, 14 Drawing Sheets

INPUT SIGNAL COORDINATION AND METHOD FOR USE WITH AN EXPANSION MODULE

BACKGROUND

The subject matter disclosed herein relates generally to industrial automation systems, and, more particularly, to expansion I/O modules for use with industrial controllers.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an expansion module is provided, comprising a digital or analog input, a digital or analog output; a backplane interface component configured to communicatively connect the expansion module to a backplane of an industrial controller that executes a control program; an I/O control component is configured to send a value of an input signal received by the digital or analog input to the industrial controller via the backplane interface and to set an output value of the digital or analog output in accordance with a control command from the industrial controller generated by the control program; and a program execution component configured to execute an expansion control program stored on the memory, wherein the I/O control component is further configured to provide the value of the input signal to the expansion control program and to set the output value of the digital or analog output in accordance with an instruction from the expansion control program.

Also, according to one or more embodiments, a method for monitoring and controlling an industrial automation system is provided, comprising communicatively interfacing, by an expansion module comprising a processor, with an industrial controller communicatively connected to the expansion module, wherein the industrial controller executes a control program; executing, by the expansion module, an expansion control program stored on a memory of the expansion module; translating, by the expansion module, an electrical input signal received at a digital or analog input of the expansion module to yield an input value; sending, by the expansion module, the input value to the industrial controller for processing by the control program; rendering, by the expansion module, the input value accessible by the expansion control program; setting, by the expansion module, an output value of a digital or analog output of the expansion module in accordance with a control command received from the industrial controller generated by the control program; and setting, by the expansion module, the output value of the digital or analog output in accordance with an instruction from the expansion control program.

Also, a non-transitory computer-readable medium is provided having stored thereon executable instructions that, in response to execution, cause an expansion module comprising at least one processor and communicatively connected to an industrial controller to perform operations, the operations comprising executing an expansion control program stored on a memory of the expansion module in parallel with execution of a primary control program that executes on the industrial controller; translating an electrical input signal received at a digital or analog input of the expansion module to yield an input value; sending the input value to the industrial controller for processing by the primary control program; processing the input value in accordance with the expansion control program; setting an output value of a digital or analog output of the expansion module in accordance with a control command received from the industrial controller and generated by the control program; and setting the output value of the digital or analog output in accordance with an instruction generated by the expansion control program based on the processing of the input value in accordance with the expansion control program.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
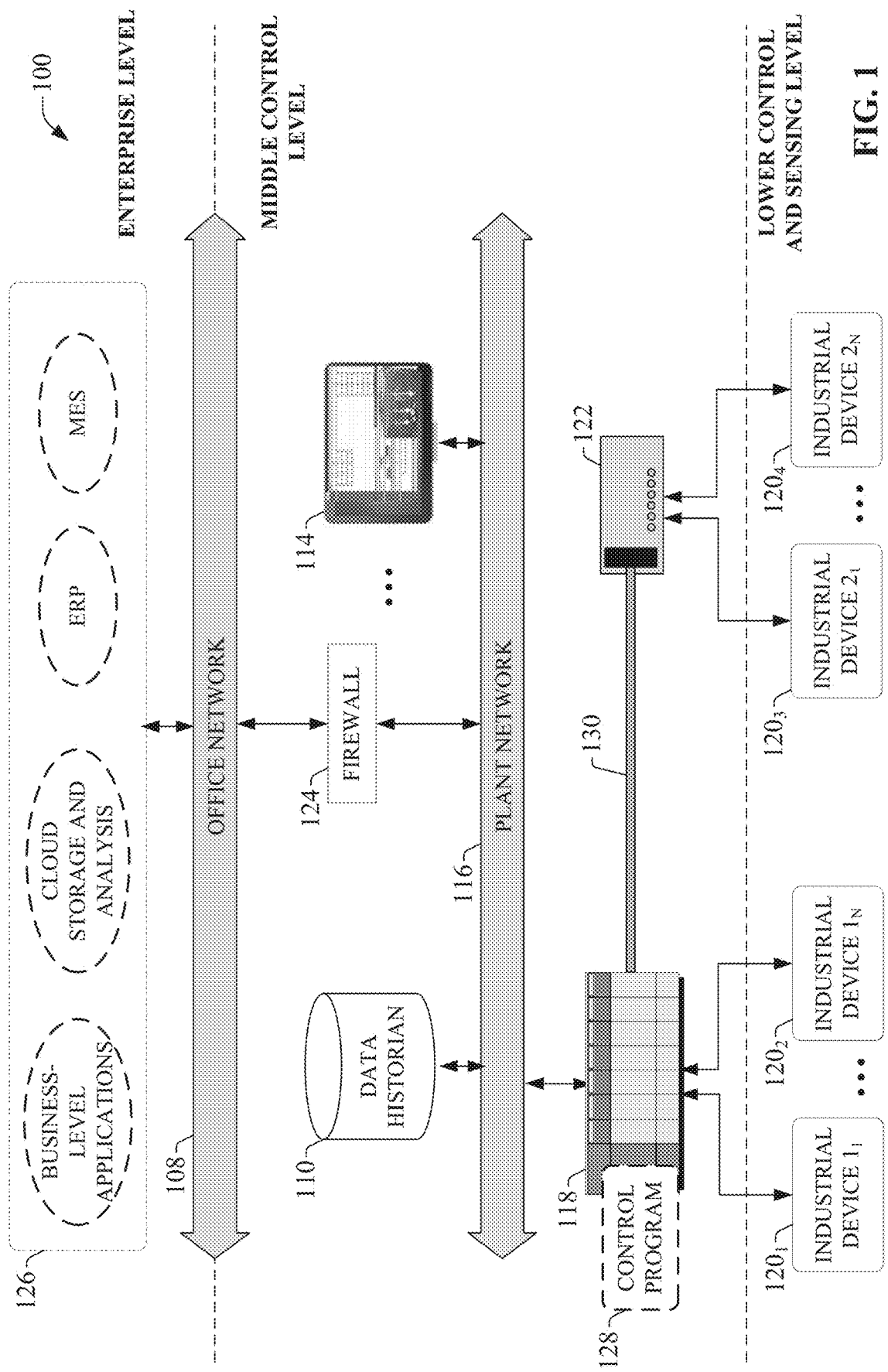
FIG. 1 is a diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100 including a number of diverse industrial devices and assets. In this example, an industrial controller 118 monitors and controls respective industrial automation systems or processes relating to product manufacture, machining, motion control, batch processing, material handling, or other such industrial functions. The industrial controller 118 executes a control program 128 to facilitate monitoring and control of industrial devices 120 making up the controlled industrial systems. The control program 128 executed by industrial controller 118 can comprise any conceivable type of code used to process input signals read from the industrial devices 120 and to control output signals generated by the industrial controller 118, including but not limited to ladder logic, sequential function charts, function block diagrams, or structured text.

Industrial devices 120 may include both input devices that provide data relating to the controlled industrial systems to the industrial controller 118, and output devices that respond to control signals generated by the industrial controller 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controller 118 may communicatively interface with industrial devices 120 over hardwired or networked connections. For example, industrial controller 118 can be equipped with native hardwired inputs and outputs that communicate with the industrial devices 120 to effect control of the devices. In some controllers 118, this I/O can be embodied in one or more I/O modules that are electrically and communicatively connected to the main control module of the industrial controller 118. The native controller I/O can include digital I/O that transmits and receives discrete voltage signals to and from the field devices, or analog I/O that transmits and receives analog voltage or current signals to and from the devices. The controller I/O can communicate with a controller's processor over a backplane—e.g., a backplane installed in the back of the controller's chassis, which serves as a power and data bus between the I/O modules and the controller—such that the digital and analog signals can be read into and controlled by the control programs. Industrial controller 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controller 118 can also store persisted data values that can be referenced by the control program 128 and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with the industrial controller 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controller 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controller 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controller 118 by HMIs 114 and presented on one or more of the display screens according to display formats chosen by the HMI developer.

Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets. Some environments may also include one or more data historians 110 that aggregate and store production information collected from the industrial controller 118 or other data sources.

In some industrial network topologies, connectivity between an office network 108 and the plant network 116 can be managed by a network switch or firewall device 124, which manages routing of information between the office and plant networks. Higher level systems 126 accessible via the office network 108 or plant network 116 may carry out functions that are less directly related to control of the industrial automation systems on the plant floor, but rather are directed to long term planning, high-level supervisory control, analytics, reporting, or other such functions. These system may reside on the office network 108 or at an external location relative to the plant facility, and may include, but are not limited to, cloud storage and analysis systems, big data analysis systems, manufacturing execution systems, data lakes, reporting systems, etc. In some scenarios, applications running in the higher level system 126 may be used for analysis of control system operational data, the results of which may be fed back to an operator at the control system, or directly to a controller 118 or device 120 in the control system.

Some industrial controllers 118 are capable of interfacing with expansion I/O modules 122, which allow the industrial controller 118 to both increase the number of its available I/O points and interface with industrial devices 120 that are located remotely relative to the controller 118. In the example architecture depicted in FIG. 1, industrial controller 118 has been interfaced with an expansion module 122, which includes its own inputs and/or outputs which can be interfaced with a set of industrial device 120 (devices $2_1$-$2_N$) located remotely relative to the industrial controller 118. Industrial controller 118 can interface with the expansion module 122 via a cable 130 that connects to the industrial controller's backplane or by another connectivity means. By this configuration, industrial controller 118 can interface with a first set of industrial devices 120 (devices $1_1$-$1_N$) via its local I/O modules, as well as a second set of industrial devices 120 (devices $2_1$-$2_N$) located at a greater distance from the controller 118 than local devices $1_1$-$1_N$. Expansion modules 122 may be powered by a separate power supply from that of the industrial controller 118, and consequently does not need to be connected to a common ground with the controller 118.

Figure 2A:
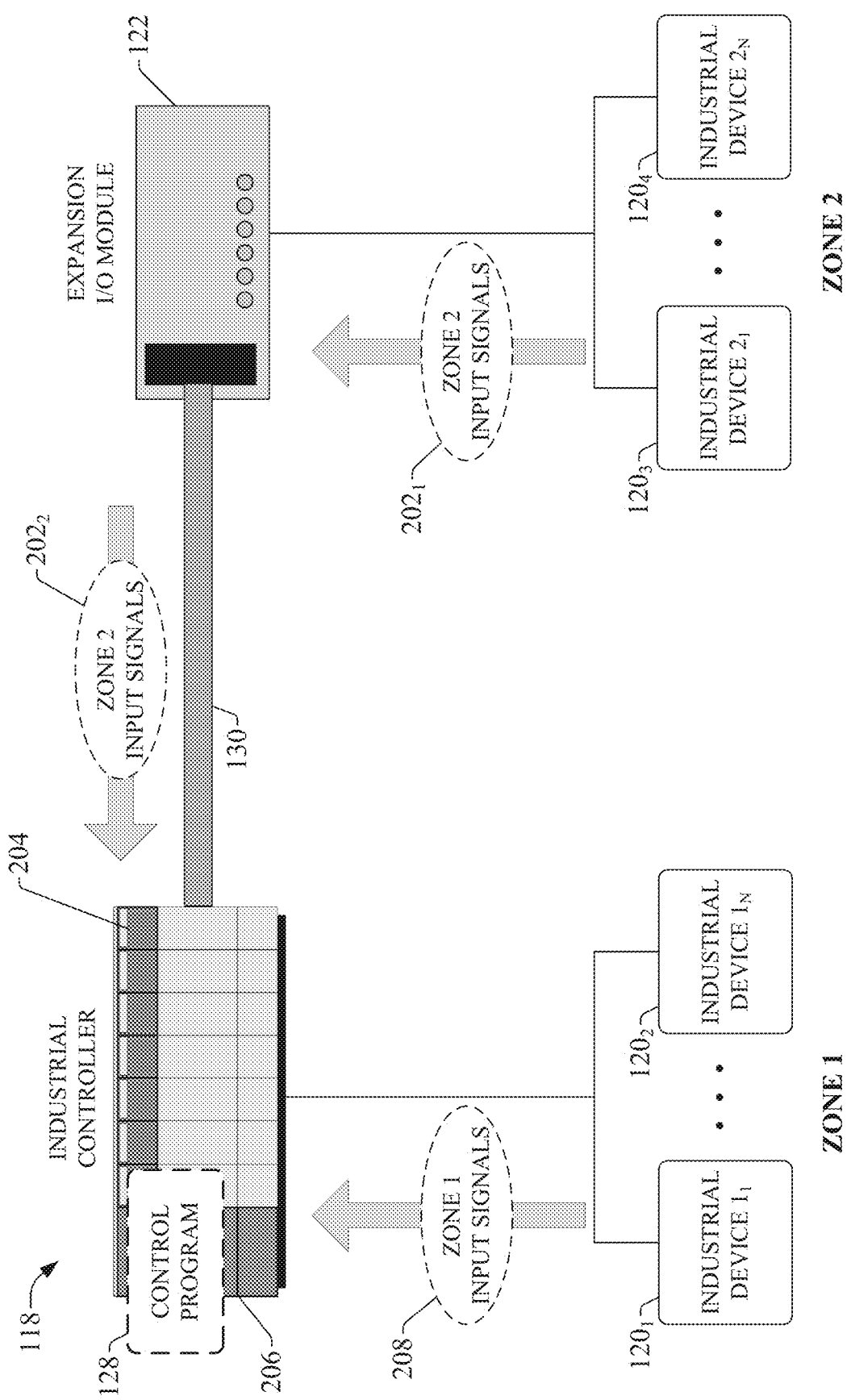
FIG. 2a is a diagram illustrating collection of device inputs into an industrial controller via the controller's local I/O as well as an expansion module.

FIG. 2a is a diagram illustrating collection of device inputs into the industrial controller 118 via the controller's local I/O as well as the expansion module 122. Industrial controller 118 comprises a control module 206 on which control program 128 executes, as well as one or more local I/O modules 204 that are locally connected to the control module 206 via the controller's backplane (or by another interfacing means). As noted above, the I/O modules 204 may comprise any combination of digital input modules, digital output modules, analog input modules, or analog output modules. In this example, the collection of industrial devices 120 that interface with the controller's local I/O modules 204 are designated Zone 1 devices. Digital and/or analog input signals generated by input devices in Zone 1 are received as Zone 1 input signals 208 via the industrial controller's local inputs.

Expansion module 122, which also comprises any combination of digital or analog inputs or outputs, interfaces with the industrial controller 118 via a cable 130. The collection of industrial devices 120 connected to the expansion module's I/O are designated Zone 2 devices. Digital and/or analog input signals generated by input devices in Zone 2 are received at the expansion module's inputs as Zone 2 input signals $202_1$ and sent back to the industrial controller 118 as Zone 2 input signals $202_2$ via cable 130 for processing in accordance with control program 128. Each input signal is associated with an I/O address that is a function of the particular local or expansion input point at which the signal was received.

Figure 2B:
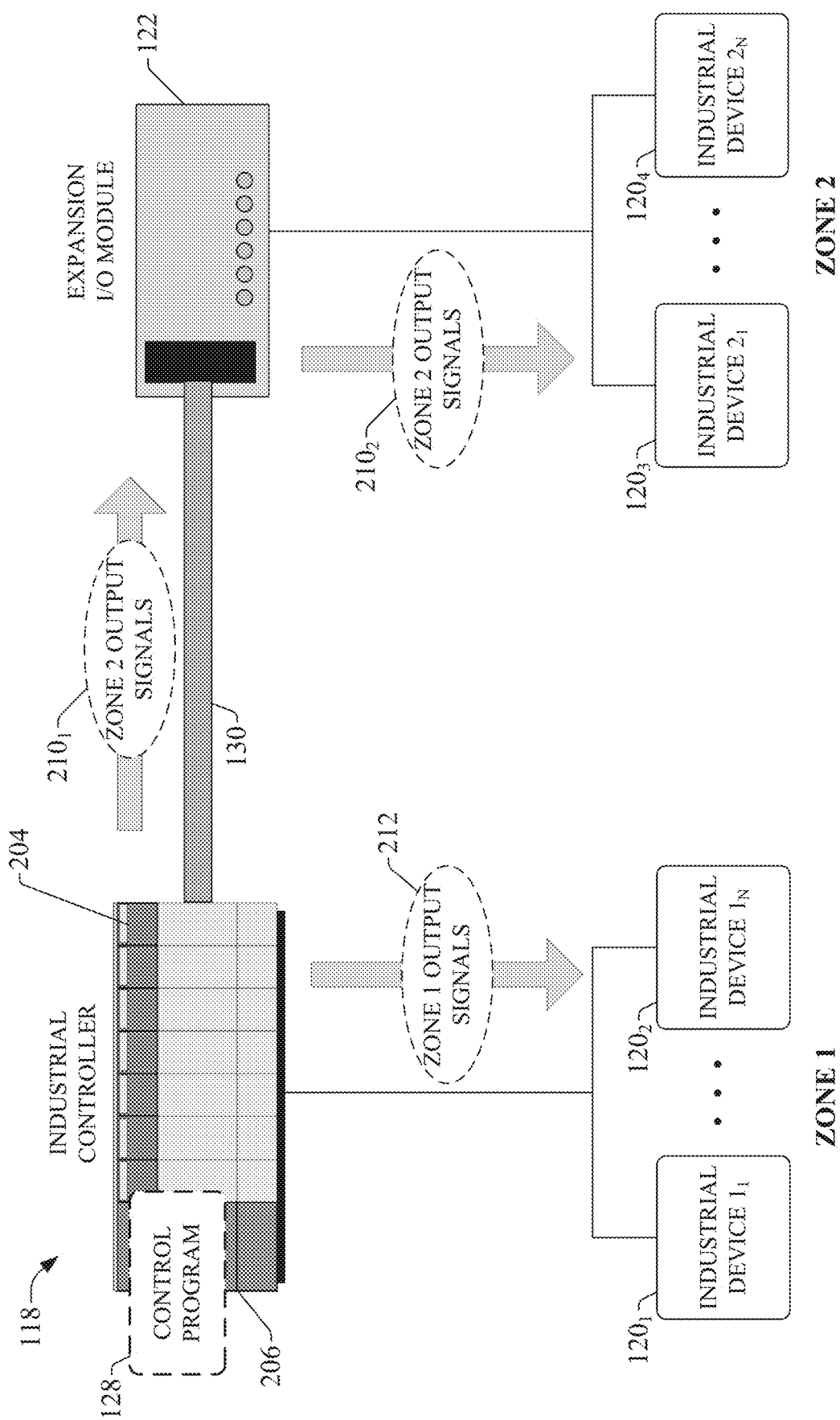
FIG. 2b is a diagram depicting generation of control output signals by the industrial controller.

The control module 206 of the industrial controller 118 processes the Zone 1 input signals 208 and Zone 2 input signals 202 in accordance with the program routines (e.g., ladder logic, structured text, function block diagrams, etc.) defined by the program 206, and generates control output signals directed to selected output devices of the industrial devices 120. FIG. 2b is a diagram depicting generation of control output signals by the industrial controller 118. As illustrated in this figure, controller 118 can issue digital and/or analog output signals to the Zone 1 devices 120 via output points of the controller's local I/O modules 204. In addition, the controller 118 can send output signals $210_1$ via cable 130 directed to outputs of the expansion module 122. These output signals $210_1$ instruct the expansion module 122 to issue Zone 2 output signals $210_2$ to selected industrial devices 120 (e.g., pneumatic actuators, lights, motor drives, safety output devices, etc.) via the expansion module's digital and/or analog output points.

The control program 128 executed by the control module 206 monitors and controls the expansion module's I/O signals (e.g., Zone 2 input signals 202 and output signals 210) as though those signals were received or generated by the local I/O modules 204. Thus, the use of expansion modules 122 extends the reach of the industrial controller 118 to remote industrial devices 120 without the need to run I/O wiring from the remote deices 120 back to the controller's local I/O modules 204. However, the need to send the expansion module's input signals 202 back to the controller via cable 130 for processing, and to send output commands 210 from the controller 118 to the expansion module 122 over cable 130, may introduce latency to the controller's ability to respond to events that occur in the industrial systems (e.g., the Zone 2 industrial devices 120) that interface with the expansion module 122. That is, the time between occurrence of an event on the Zone 2 system—indicated by an input signal 202—for which a control response is required and issuance of an appropriate control output signal 210 in response to the event may be longer than would be the case for a Zone 1 event due to the additional data path represented by cable 130 over which the industrial controller 118 and the expansion module 122 must exchange data.

To address this and other issues, one or more embodiments described herein provide an expansion module capable of performing independent local processing of its input signals, and to independently generate control outputs directed to its locally connected industrial devices. The expansion module can be provisioned with an expansion control program that is separate from the primary control program executed by the industrial controller itself, and which monitors and controls the expansion module's I/O in accordance with one or more control tasks or routines defined by the expansion control program. In some implementations, the control tasks defined by the expansion control program can be a different set of control tasks then those carried out by the primary control program; e.g., tasks that are considered to be particularly time-critical and which are therefore more beneficially carried out on the expansion module itself. This independent monitoring and control by the expansion module can be carried out simultaneously, or in parallel, with the primary monitoring and control performed by the industrial controller 118. This can reduce or eliminate response latency that would otherwise be introduced if all monitoring and control were performed by the industrial controller 118 alone. This approach can be particularly beneficial for configurations in which the industrial devices that are monitored and controlled via the expansion module require fast response times, as in the case of industrial safety applications.

Figure 3:
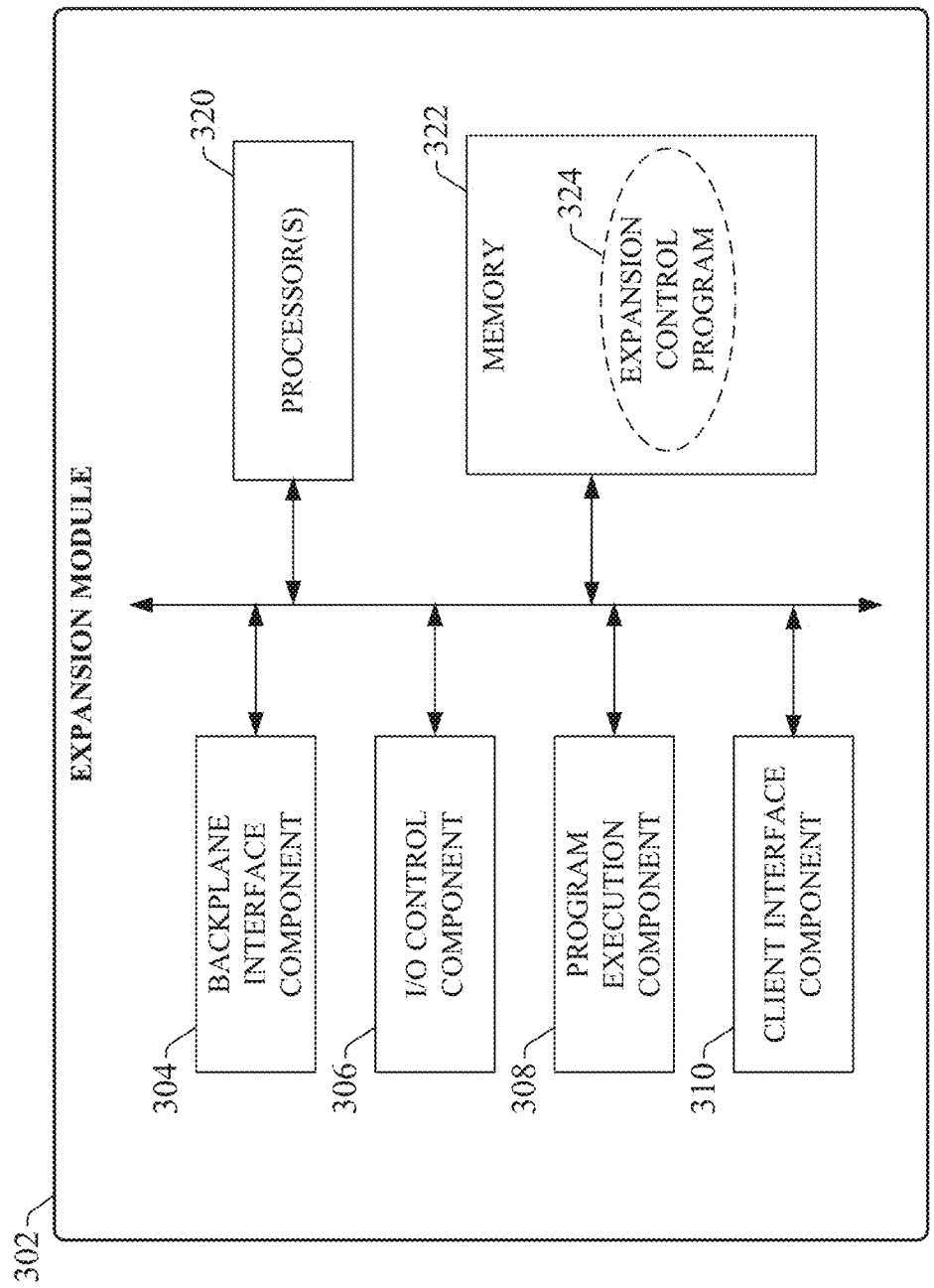
FIG. 3 is a block diagram of an example expansion module capable of executing a locally stored expansion control program to facilitate local monitoring and control of its local I/O devices.

FIG. 3 is a block diagram of an example expansion module 302 capable of executing a locally stored expansion control program 324 to facilitate local monitoring and control of its local I/O devices, thereby supplementing primary monitoring and control by the industrial controller to which the expansion module 302 is interfaced. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Expansion module 302 can include a backplane interface component 304, an I/O control component 306, a program execution component 308, a client interface component 310, one or more processors 320, and memory 322. In various embodiments, one or more of the backplane interface component 304, I/O control component 306, program execution component 308, client interface component 310, the one or more processors 320, and memory 322 can be electrically and/or communicatively coupled to one another to perform one or more of the functions of the expansion module 302. In some embodiments, components 304, 306, 308, and 310 can comprise software instructions stored on memory 322 and executed by processor(s) 320. Expansion module 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Backplane interface component 304 can be configured to electrically and communicatively connect the expansion module 302 to the backplane of an industrial controller (e.g., a backplane installed at the back of the controller chassis), or to otherwise communicatively connect the expansion module 302 to the industrial controller by another means. In some embodiments, backplane interface component 302 can include, for example, a connector that plugs into or otherwise interfaces with a first end of a cable (e.g., cable 130) over which the expansion module 302 exchanges data with the industrial controller. The backplane interface component 304 can also include any electronics or software necessary to exchange data with the industrial controller using any suitable communications protocol.

I/O control component 306 can be configured to translate input signals received at the expansion module's input points into digital or analog values, and to control the output signals delivered by the expansion module's output points in accordance with the type of I/O supported by expansion module 302. For example, if the expansion module's I/O includes analog outputs, I/O control component 306 can be configured to generate voltage or current output signals (e.g., 0-10 VDC or 4-20 mA outputs) proportional to analog values set by the primary control program that executes on the industrial controller or by the expansion control program 324 executed on the expansion module 302 itself, and to output the generated signals on the module's output terminals. If the expansion module 302 supports analog inputs, I/O control component 306 can be configured to generate analog values for processing by the primary control program or by the expansion control program 324, where the analog values are proportional to analog electrical signals (e.g., 0-10 VDC or 4-20 mA input signals) received at the expansion module's input terminals. In the case of digital inputs and outputs, I/O control component 306 can set the expansion module's digital outputs to generate either an ON signal or an OFF signal as specified by the primary or expansion control program, and to translate electrical signals received at the expansion module's inputs as either ON or OFF signals. Other types of module functionality are also within the scope of one or more embodiments.

Program execution component 308 can be configured to execute an expansion control program 324 (e.g., a ladder logic program, a sequential function chart program, etc.) stored on the expansion module's memory 322 to facilitate local monitoring and control of industrial devices whose inputs and outputs are locally connected to the expansion module 302. Expansion control program 324 is a separate program from that which executes on the main industrial controller for which the expansion module 302 serves as a remote I/O module, such that inputs received via the expansion module's inputs (e.g., input terminals or networked inputs) can be processed by both the expansion control program 324 and the main control program, and the expansion module's outputs (e.g., output terminals or networked outputs) can be controlled by both the expansion control program 324 and the main control program.

Client interface component 310 can be configured to exchange data with a client device interfaced with the expansion module 302, such as a desktop, laptop, or tablet computer; a mobile device such as a smart phone; or other such client device. In some embodiments, connectivity between the client device and expansion module 302 via the client interface component 310 can allow a user to define the expansion control program 324 (e.g., ladder logic or other type of industrial control program) to be executed by the expansion module's program execution component 308. Alternatively, expansion control program 324 can be exported to the expansion module 302 from the main industrial controller.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
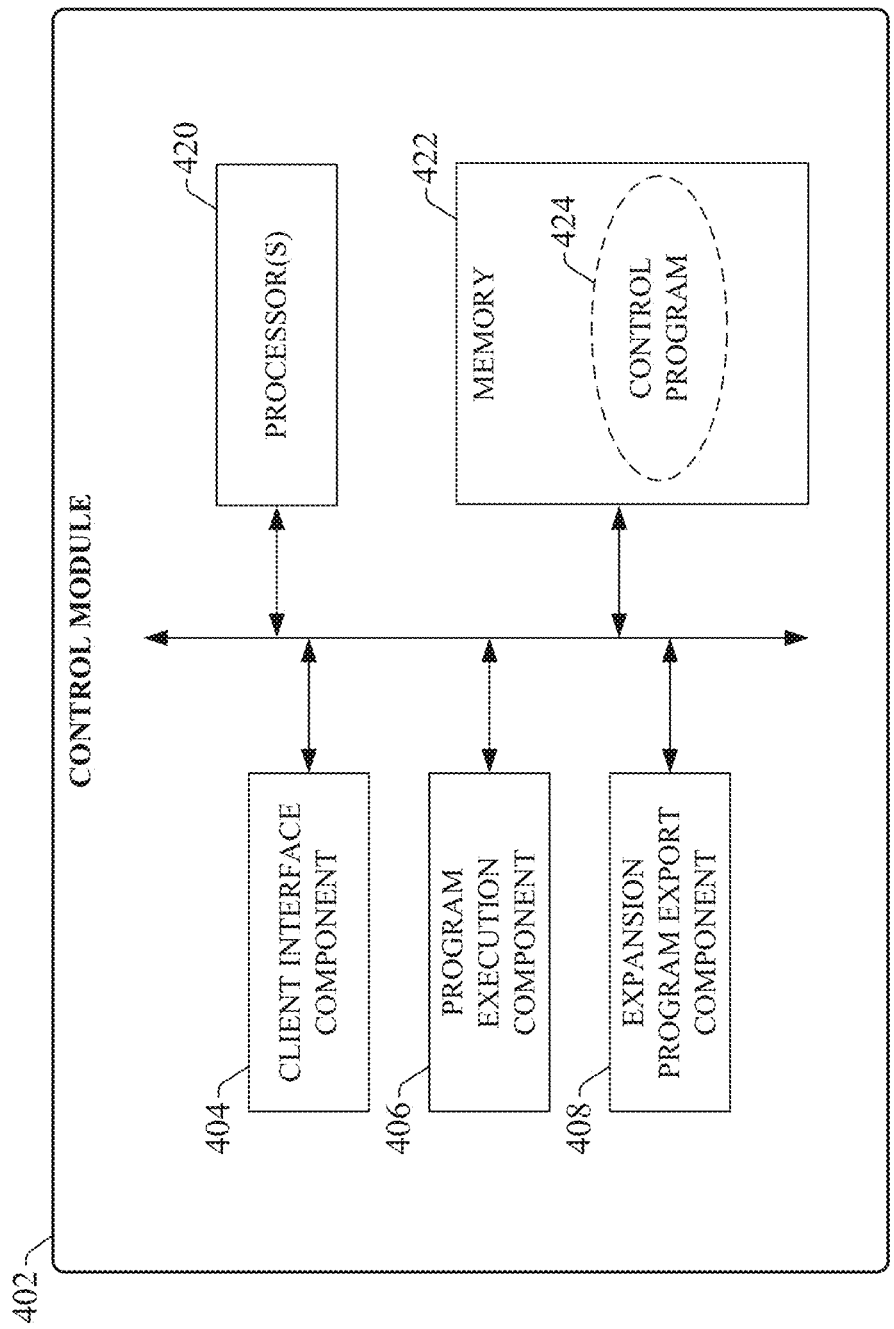
FIG. 4 is a block diagram of an example control module of an industrial controller that includes interface support for an expansion module with independent monitoring and control capabilities.

FIG. 4 is a block diagram of an example control module 402 of an industrial controller that includes interface support for an expansion module 302 with independent monitoring and control capabilities. Control module 402 can include a client interface component 404, a program execution component 406, an expansion program export component 408, one or more processors 420, and memory 422. In various embodiments, one or more of the client interface component 404, program execution component 406, expansion program export component 408, the one or more processors 420, and memory 422 can be electrically and/or communicatively coupled to one another to perform one or more of the functions of the control module 402. In some embodiments, components 404, 406, and 408 can comprise software instructions stored on memory 422 and executed by processor(s) 420. Control module 402 may also interact with other hardware and/or software components not depicted in FIG. 4. For example, processor(s) 420 may interact with one or more external user interface devices, such as a keyboard, a mouse, a display monitor, a touchscreen, or other such interface devices.

Client interface component 404 can be configured to exchange data with a client device interfaced with the control module 402, such as a desktop, laptop, or tablet computer; a mobile device such as a smart phone; or other such client device. In an example embodiment, a controller configuration application may execute on the client device, and this application can be used to create and download (via client interface component 404) the control program 424 to be executed by the control module 402. The configuration application can also be used to configure other settings and parameters of the control module 402, including but not limited to I/O definitions that define the 110 modules that will be connected to the control module 502, communication settings, and other such parameters.

Program execution component 406 can be configured to execute the control program 424 stored on memory 422. The control program 424 may be, for example, a ladder logic program, a function block diagram, a structured text program, or a program conforming to another format. Expansion program export component 408 can be configured to export an expansion control program 324 to an expansion module 302 connected to the control module 402 (e.g., via a cable 130).

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
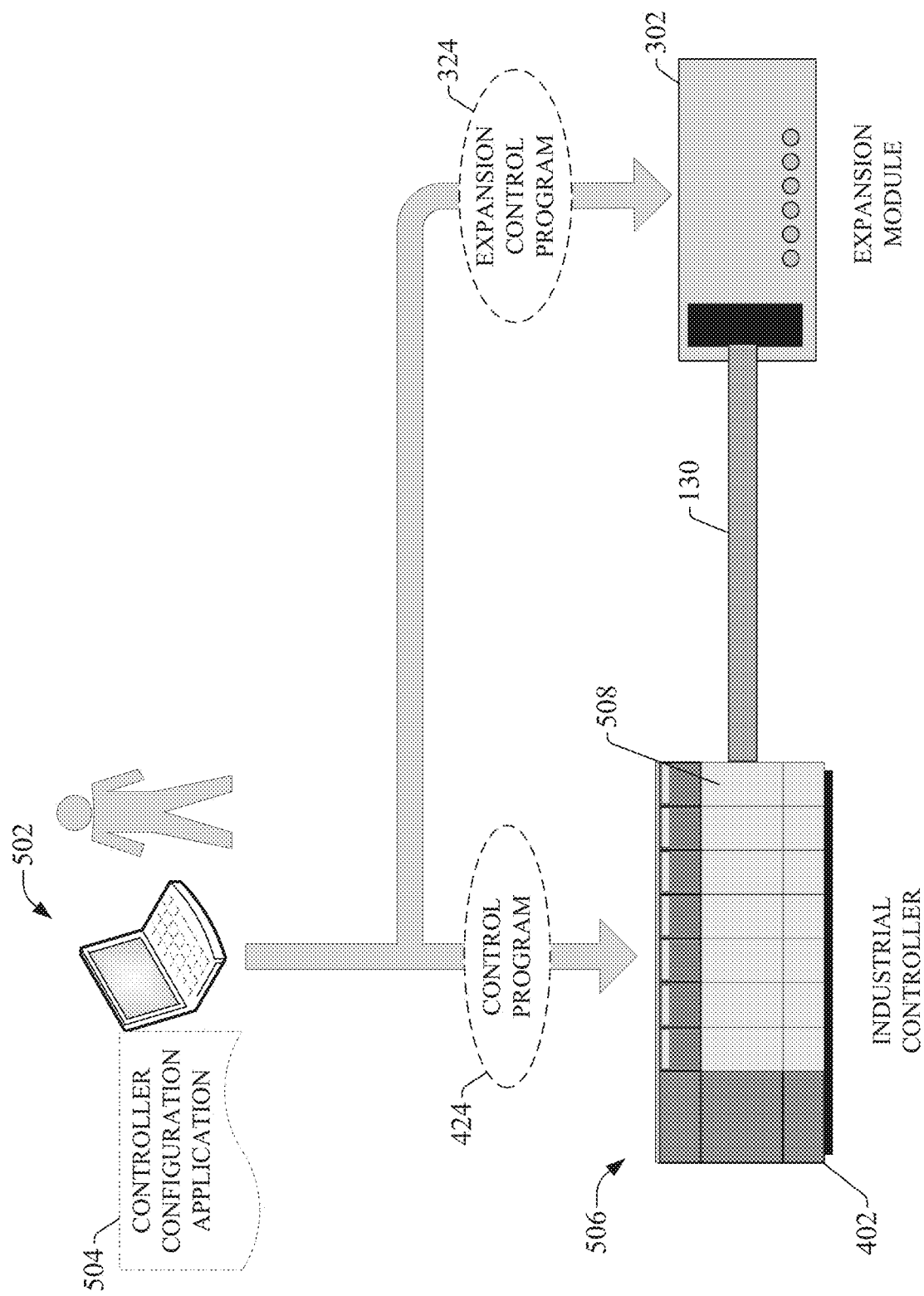
FIG. 5 is a diagram illustrating configuration of an industrial controller and an associated expansion module.

FIG. 5 is a diagram illustrating configuration of an industrial controller 506 and an associated expansion module 302 according to one or more embodiments. Industrial controller 506 comprises a control module 402 and one or more I/O modules 508, which interface with industrial input and output devices in the field (e.g., devices 120). As described above, expansion module 302 connects to the industrial controller 506 via a cable 130 over which the expansion module 302 exchanges data with the controller 506, allowing expansion module 302 to serve as a remote I/O interface between the industrial controller 506 and other devices in the field that may be located at greater distances from the controller 506 relative to the devices connected to the controller's local I/O modules 508.

In this example, a client device 502 (e.g., a laptop computer or other type of client device) executes a controller configuration application 504, which is used to configure the industrial controller 506 and the expansion module 302. Controller configuration application 504 renders development interfaces on the client device 502, and a system designer can interact with these development interfaces to develop a control program 424 for execution on the industrial controller 402. Control program 424 may be, for example, a ladder logic program, a sequential function chart, a function block diagram, structured text, or another type of control program capable of execution by the controller's control module 402. Control program 424 can then be downloaded to the controller's control module 402 (e.g., via client interface component 404) for execution.

Additionally, the system developer can create a separate expansion control program 324 for execution on the expansion module 302. In some embodiments, the development interfaces rendered by the controller configuration application 504 can include separate development windows or tabs for development of the control program 424 and the expansion control program 324.

Figure 6:
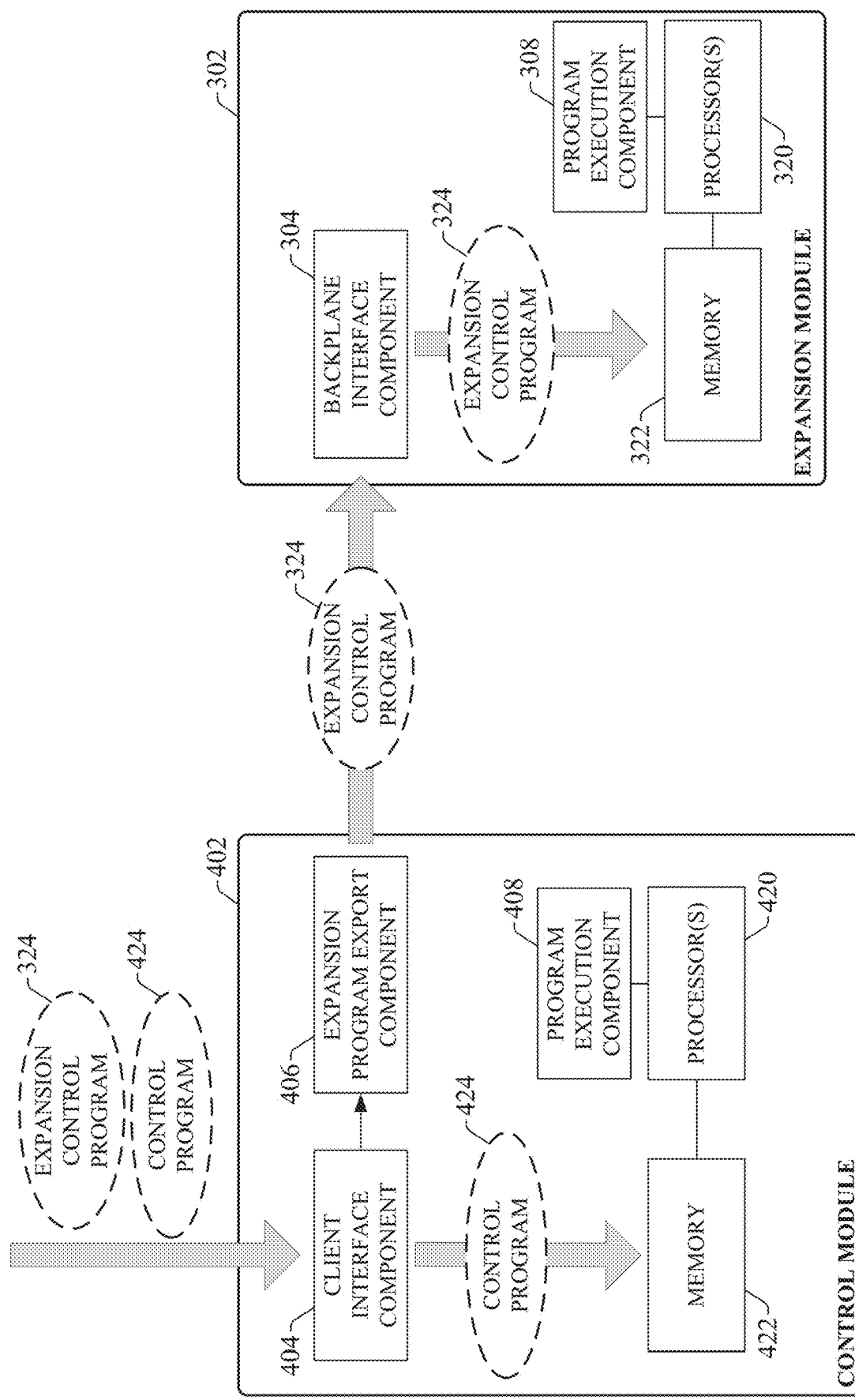
FIG. 6 is a diagram illustrating programming of a control module and an expansion module via a client interface component of the control module.

In some embodiments, expansion control program 324 can be downloaded directly to the expansion module 302 by connecting client device 502 to the expansion module's client interface component 310. Using this approach, the client device 502 can be connected to the industrial controller 402 (that is, to the control module 402 of industrial controller) to facilitate downloading of the control program 424 to the control module 402, and can be separately connected to the expansion module 302 to facilitate downloading the expansion control program 324 to the expansion module 302. Alternatively, in some embodiments both the control module 402 and the expansion module 302 can be programmed by connecting the client device 502 to the control module 402 alone, without the need to connect the client device 502 directly to the expansion module 302. FIG. 6 is a diagram illustrating programming of the control module 402 and the expansion module 302 via the client interface component of the control module 402. According to this approach, client device 502—executing controller configuration application 504—can be connected to the client interface component 404 of control module 402, and both the control program 424 and the expansion control program 324 can be downloaded from the client device 502 to the control module 402. In response to receipt of this combined programming data, control module 402 can store the control program 424 on local memory 422, and expansion program export component 406 can export the expansion control program 324 to the expansion module 302; e.g., via cable 130 or over another data connection between control module 402 and expansion module 302. The expansion program 324 is received at the expansion module 302 via the backplane interface 304 and is stored on the expansion module's memory 322. During operation, the control program 424 and the expansion control program 324 can be executed by the respective program execution components 408 and 308 of the control module 402 and the expansion module 302.

Figure 7A:
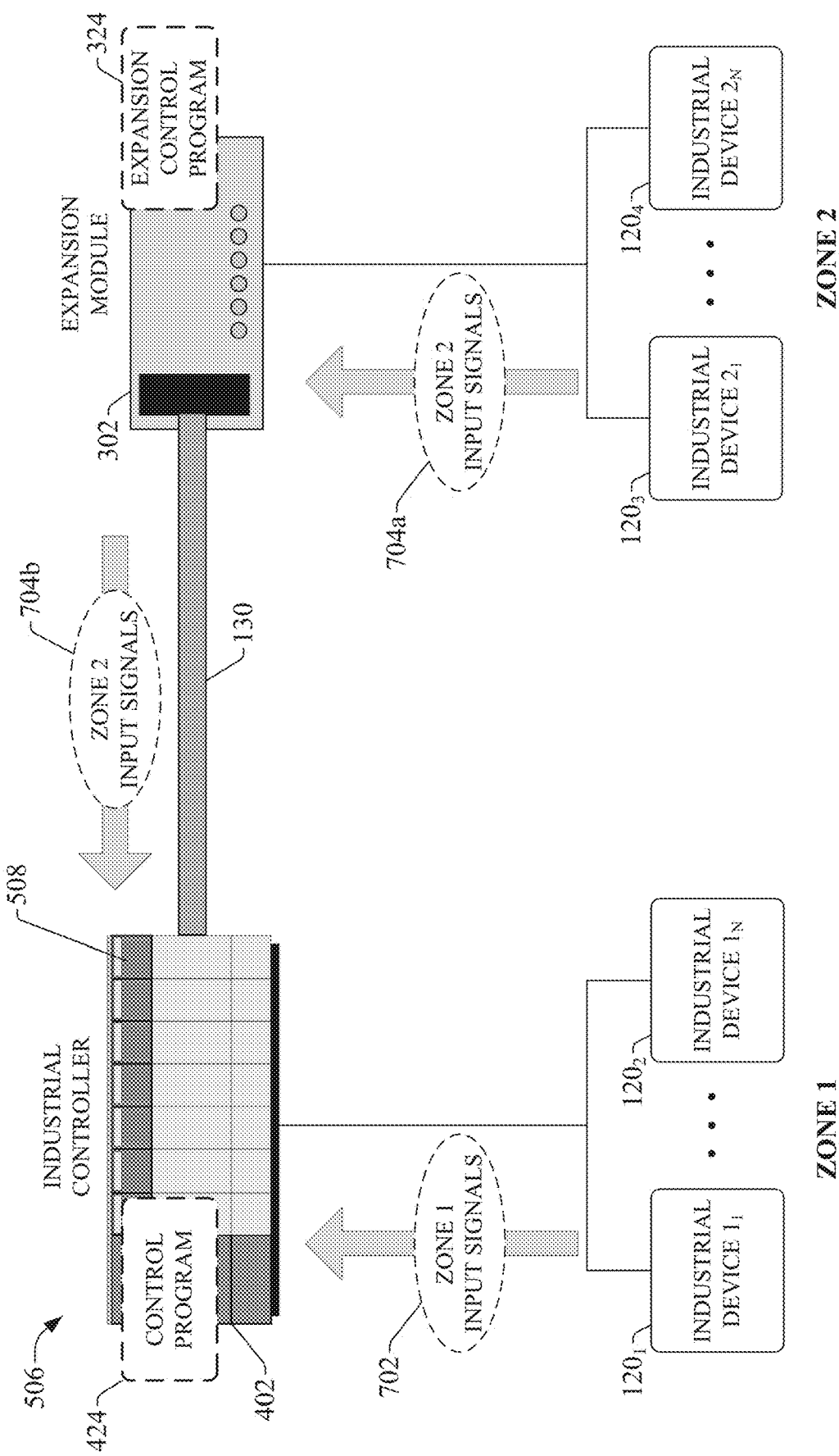
FIG. 7a is a diagram illustrating collection of industrial inputs by an industrial controller and an expansion module.

FIG. 7a is a diagram illustrating collection of industrial inputs by the industrial controller 506 and the expansion module 302. Industrial devices 120 can interface with the industrial controller 506 and the expansion module 302 via hardwired connections (e.g., I/O wiring that connects the industrial devices' inputs and outputs to corresponding input and output terminals of the I/O modules 508 and the expansion module 302) or via networked connections for embodiments of industrial controller 506 or expansion module 302 that support networked I/O. During operation, the industrial controller 506 performs monitoring and control of industrial devices 120 in accordance with control program 424, as described in previous examples. This includes collection and processing of input signals 702 from local industrial input devices (e.g., industrial devices $1_1$-$1_N$) located in Zone 1, as well as input signals 704 from remote industrial devices 120 (e.g., industrial devices $2_1$-$2_N$) whose inputs and outputs are connected to the I/O of expansion module 302. As described in previous examples, the input signals 704 received by the expansion module 302 from the industrial devices 120 in Zone 2 are sent back to the industrial controller 508 via cable 130, so both input signals 704 collected by the expansion module 302 and input signals 702 from the devices 120 locally connected to the controller's I/O modules 508 can be processed by the control module 402 in accordance with the primary control program 424. In some implementations, control program 424 can reference the input signals using each signal's I/O address as defined by the industrial controller's I/O definitions.

In this way, both sets of input signals 702 and 704 are consumed and processed by control program 424 executing on industrial controller 506. In parallel with execution of control program 424, expansion control program 324 can execute on the expansion module 302 to perform separate, independent processing of the Zone 2 input signals 704 received from the industrial devices 120 connected to the expansion module 302 (e.g., industrial devices $2_1$-$2_N$). According to this configuration, the input signals 704 from Zone 2 are processed by both the primary control program 424 and the expansion control program 324.

Figure 7B:
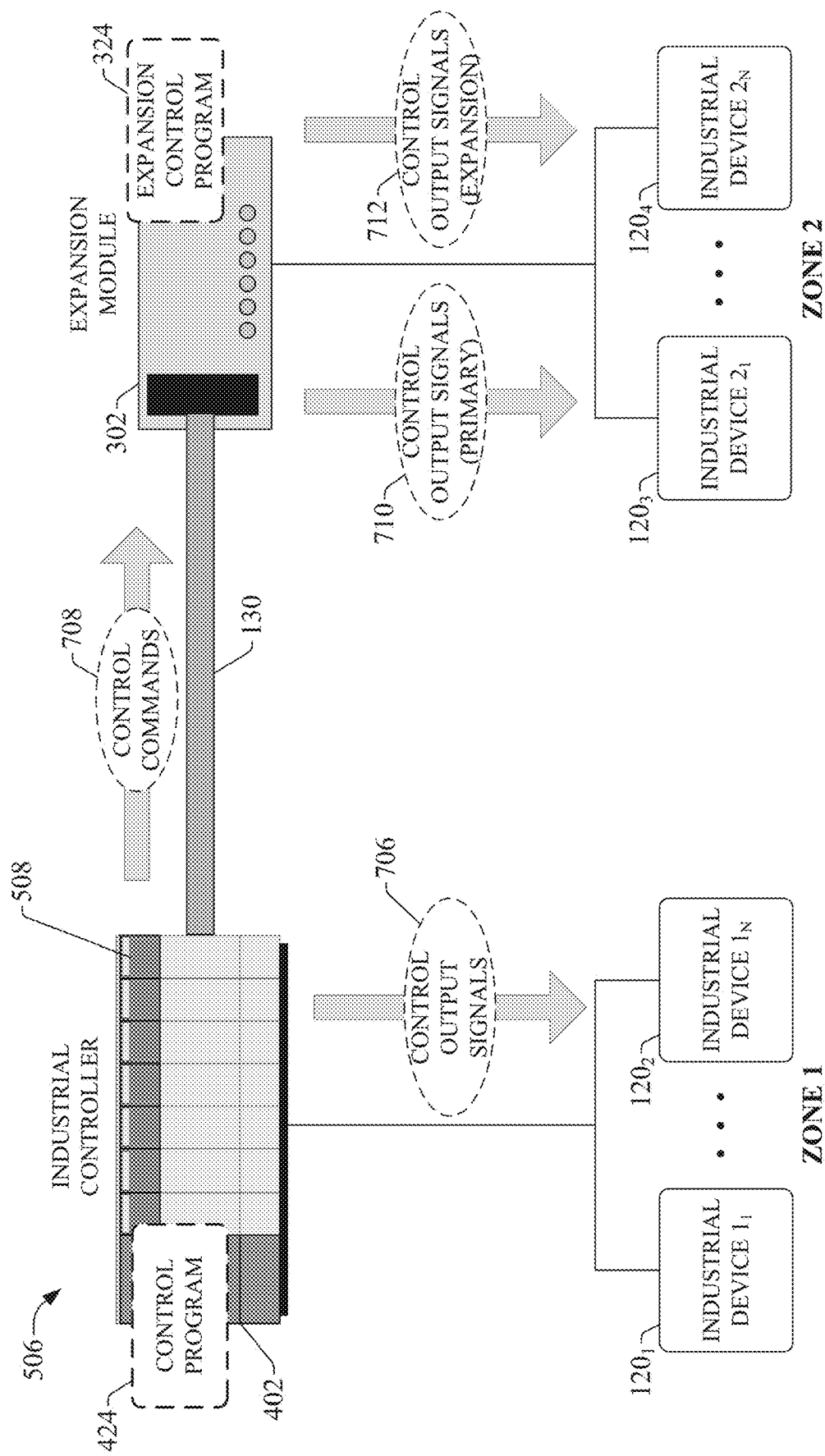
FIG. 7b is a diagram illustrating generation of output signals directed to industrial devices by an industrial controller and an expansion module.

Control program 424 and expansion control program 324 are both capable of setting digital and/or analog output signals from the expansion module 302 in accordance with the control routines or tasks defined by the respective programs. FIG. 7b is a diagram illustrating generation of output signals directed to the industrial devices 120 by the industrial controller 506 and the expansion module 302. During operation, the primary control program 424 executed by the control module 424 of the industrial controller 506 sets values of control output signals 706 and 710 based on monitored values of the input signals 702 and 704 received via the local I/O modules 508 and from the expansion module 302 (as illustrated in FIG. 7a). In the case of local control output signals 706, the control program 424 sets selected digital or analog output points of the controller's I/O modules 508, thereby delivering control outputs to selected industrial devices 120 in Zone 1 (that is, to devices connected to the controller's local I/O modules). In the case of remote output signals 710, the control program issues control commands 708 to the expansion modules 302 via cable 130. These control commands 708 instruct expansion module 302 to set specified analog or digital outputs to thereby send control signals 710 to selected industrial devices 120 connected to the expansion module's I/O points.

While the main control program 424 performs these monitoring and control tasks, expansion control program 324 executes on the expansion module 302 independently from the main control program 424 and sets expansion control output signals 712 based on monitored values of the Zone 2 input signals 704. Thus, in parallel with the primary control carried out by the main control program 424, expansion module 302 performs supplemental local monitoring and control of the Zone 2 devices 120 that are connected to the expansion module's I/O. In some configurations, expansion control program 324 may be designed to execute routines that are particularly time-critical, such as safety applications. For example, one or more of the Zone 2 devices connected to the expansion module 302 may be a safety input device, such as a light curtain, pull cord, safety mat, or another type of safety device. An input signal 704 indicating that such a safety device has been tripped may require an immediate response from the control system; e.g., an immediate setting or resetting of an output signal to a particular hazardous device or machine. If the safety handling routine were included in the main control program 424, it would be necessary for the expansion module 302 to relay the safety device input signal to the industrial controller 506 via cable 130 for processing by control program 424, and to await a control command 708 from the controller 506 instructing the expansion module to set or reset the time-critical output signal. This round-trip signal path can introduce latency to the response time. Instead, the safety handling routine can be included as part of the expansion control program 324 that executes locally on the expansion module 302, allowing the safety monitoring and response to be handled locally at the expansion module 302. Other example time-critical routines that may beneficially be implemented in the expansion control program 324 can include, but are not limited to, safe speed monitoring applications whereby a motor is slowed or stopped based on feedback from sensors (received as input signals 704).

Since both control program 424 and expansion control program 324 have control over the expansion module's outputs and typically execute different control routines, there may be circumstances in which the control program 424 and expansion control program 324 issue simultaneous conflicting control commands to the same expansion module output. For example, control program 424 may issue a control command 708 that sets a Zone 2 control output signal 710 corresponding to a motor speed control signal (e.g., a conveyor speed, a centrifuge rotational speed, etc.) to a first value in accordance with normal operation of the industrial automation system being controlled. Meanwhile, the expansion control program 324 may detect an unsafe condition based on a monitored value of a Zone 2 input signal 704*a*, and in response set the same control output signal 710 to a second, smaller motor speed value in accordance with a safety routine executed by the expansion control program 324. Accordingly, some embodiments of the expansion module 302 and control module 402 may support conflict resolution features that allow the system developer to predefine (e.g., using controller configuration application 504) criteria for selecting which of the two control programs are to be given priority in the event that both programs issue conflicting commands to the same output of the expansion module. In various embodiments, the controller configuration application 504 may allow the user to specify one of the two control programs that is to be given priority in all cases, or may allow the user to specify conflict resolution criteria that define control scenarios in which one or the other of the two programs is to be given priority. For example, as part of the device configurations for the control module 402 and the expansion module 302, the system developer may specify that the expansion control program 324 is to be given priority in the event of an output command conflict if a safety device input indicates that a safety device is tripped, and that the main control program 424 is to be given priority in all other scenarios. Other scenarios that may be defined and associated with a preferred priority program can include, but are not limited to, a specified machine operating mode, a time of day or current work shift, a specified product currently being manufactured by the automation system, or other such scenarios.

According to the architecture depicted in FIGS. 7*a* and 7*b*, control program 424 and expansion control program 324 can run respective different control tasks (e.g., primary monitoring and control tasks by the control program 424, and safety tasks or other time-critical functions by the expansion control program 324), and both tasks can be programmed to be initiated by the same input signal 704 received via the expansion module 302. By enhancing the capabilities of expansion modules 302 to include execution of independent control programs in parallel with the primary control performed by the main control program, time-critical monitoring and control functions can be assigned to the expansion module 302 for execution, which can reduce the response times for these time-critical functions.

Figure 8:
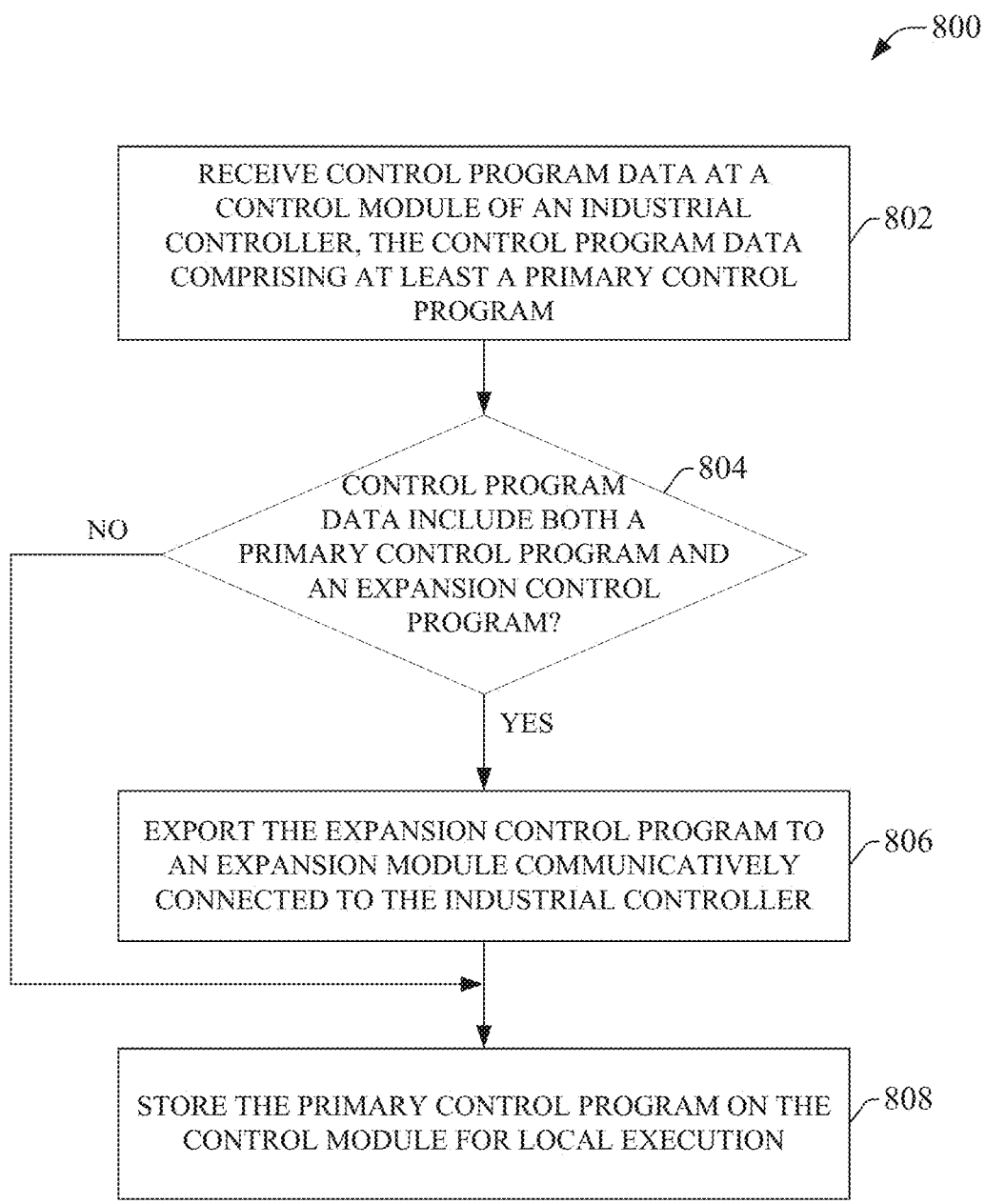
FIG. 8 is a flowchart of an example methodology for programming an industrial controller and associated expansion module having supplemental monitoring and control capabilities.
Figure 9A:
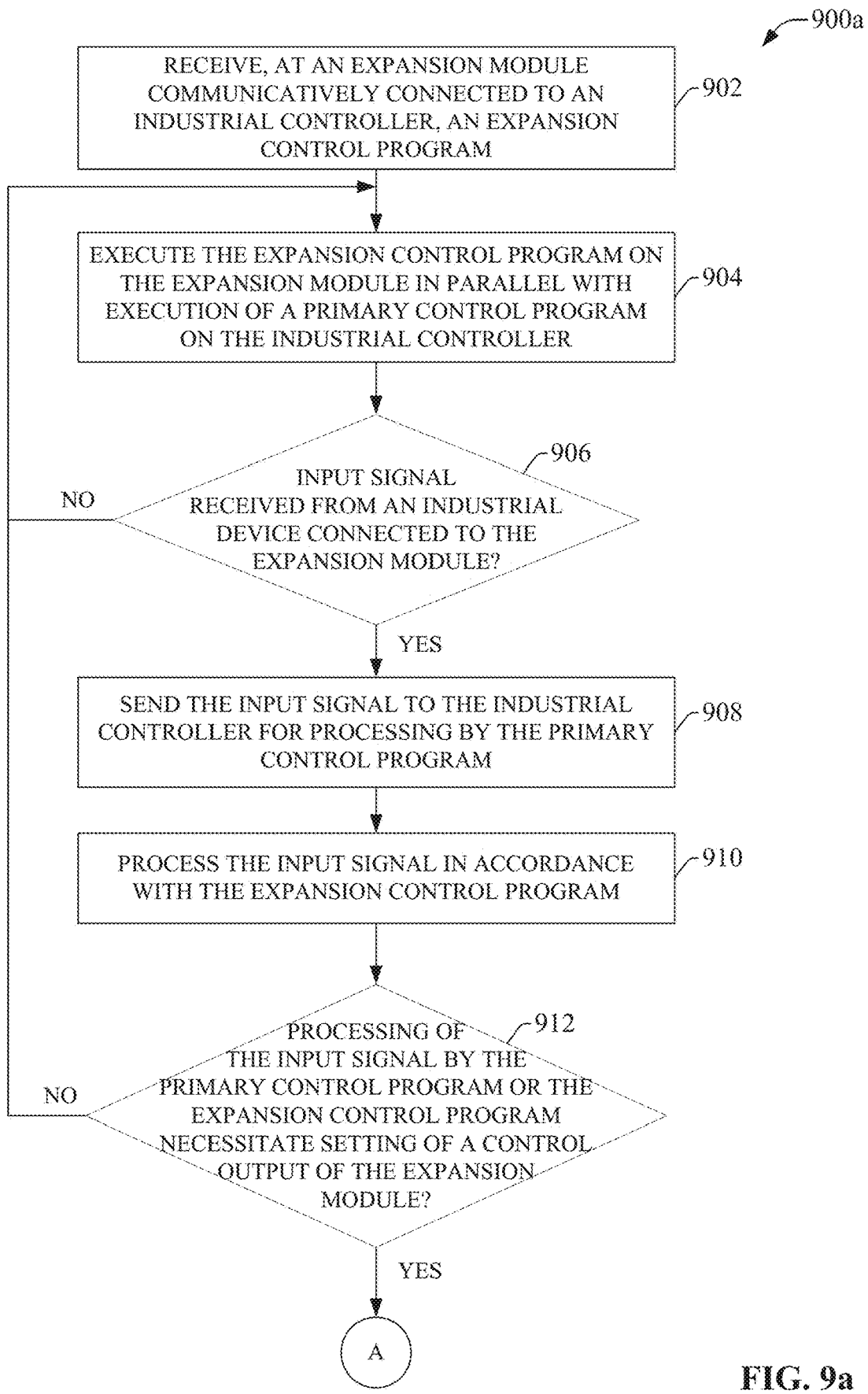
FIG. 9a is a flowchart of a first part of the example methodology for executing an expansion control program on an expansion module of an industrial controller in parallel with the primary control program executed by the industrial controller.
Figure 9B:
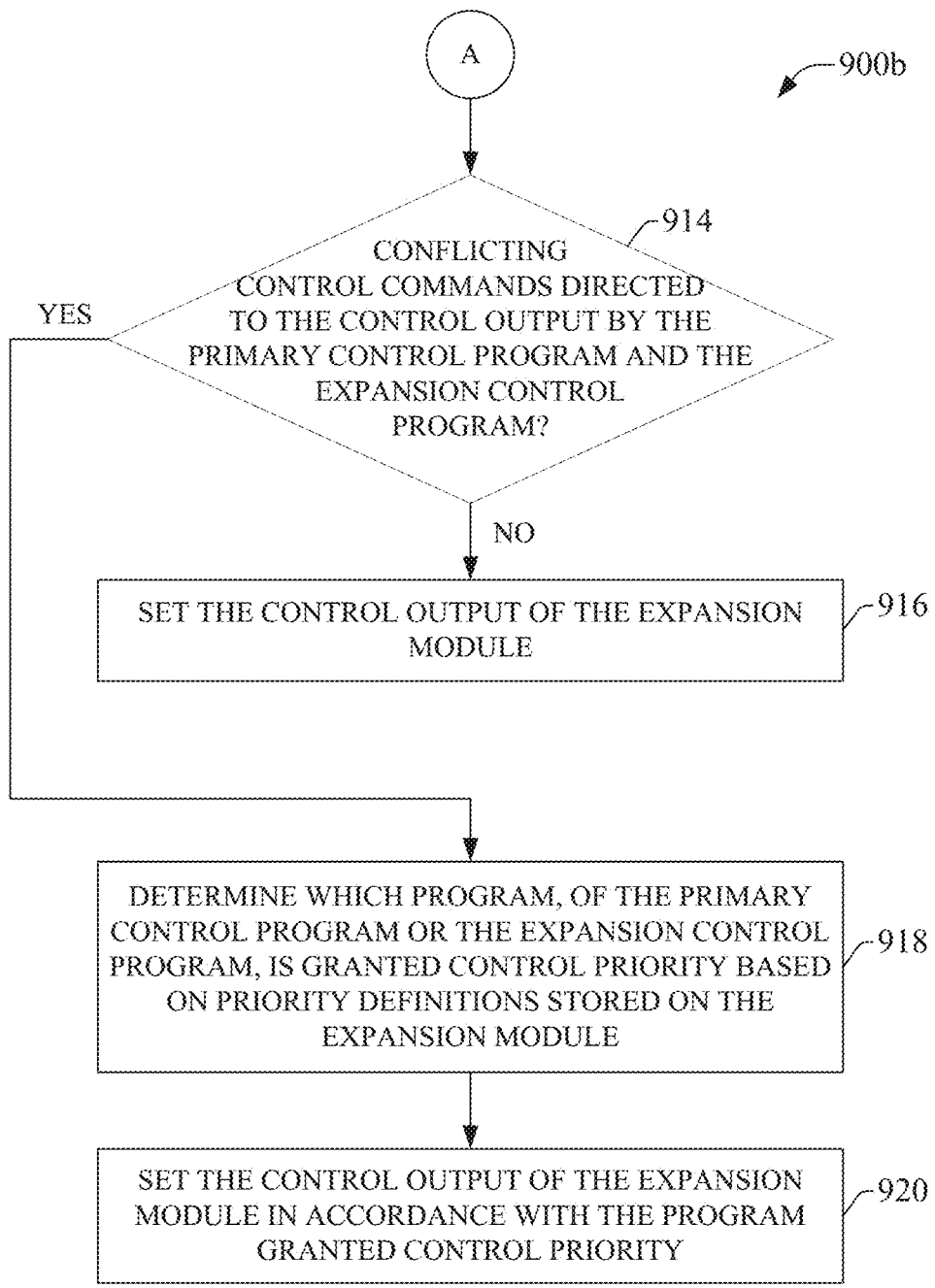
FIG. 9b is a flowchart of a second part of the example methodology for executing an expansion control program on an expansion module of an industrial controller in parallel with the primary control program executed by the industrial controller.

FIGS. 8-9*b* illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 80 for programming an industrial controller and associated expansion module having supplemental monitoring and control capabilities. Initially, at 800, control program data is received at a control module of an industrial controller. The control program data comprises at least a primary control program to be executed by the control module. The primary control program may be, for example, a ladder logic program, a function block diagram, a structured text program, or another type of industrial control program. The control program data may be received, for example, from a client device executing a controller configuration application (e.g., a program development platform).

At 804, a determination is made as to whether the control program data received at step 802 includes both the primary control program and an expansion control program to be executed on an expansion module that is communicatively connected to the industrial controller. If the control program data does not include an expansion control program (NO at step 804)—that is, the control program data defines only the primary control program—the methodology proceeds to step 808, where the primary control program is stored on the control module for local execution by the control module. Alternatively, if the control program data includes both a primary control program and an expansion control program (YES at step 804), the methodology proceeds to step 806, where the expansion control program is exported to the expansion module (e.g., via a cable that connects the expansion module to the industrial controller), while the primary control program is stored on the control module for local execution (step 808).

FIG. 9*a* illustrates a first part of an example methodology 900*a* for executing an expansion control program on an expansion module of an industrial controller in parallel with the primary control program executed by the industrial controller. Initially, at 902, an expansion control program is received at an expansion module communicatively connected to an industrial controller. In some embodiments, the expansion control program can be received from the industrial control program via a communication cable that connects the expansion module to the industrial controller (e.g., using methodology 800). Alternatively, the expansion module can be programmed directly using a client device communicatively connected to the expansion module. At 904, the expansion control program is executed on the expansion module in parallel with execution of a primary control program on the industrial controller.

At 906, a determination is made as to whether an input signal is received from an industrial device connected to the I/O of the expansion module. The input signal may be a digital (or discrete) input or may be an analog signal that is interpreted as an analog or continuous value by the expansion module. The industrial device can be substantially any type of industrial input device, including but not limited to a push button input, an input from a sensor (e.g., a proximity sensor, a photo-eye, etc.), an input from a safety device (e.g., a light curtain, a pull cord, a safety mat, etc.), or other such inputs. If an input signal is received at the expansion module (YES at step 906), the methodology proceeds to step 908, where the expansion module sends the input signal to the industrial controller for processing by the primary control program (e.g., via the communication cable that links the expansion module to the industrial controller). At 910, the input signal is also processed locally at the expansion module in accordance with the expansion control program.

At 912, a determination is made as to whether the processing of the input signal by the primary control program or the expansion control program necessitates setting of a control output of the expansion module. This determination is based on the control algorithms defined by the respective control programs, and may also be a function of other input signals received via the expansion module and/or the industrial controller's local I/O modules. If processing of the input signal by either of the primary or expansion control program necessitates setting of a control output of the expansion module (YES at step 912), the methodology proceeds to the second part of the example methodology 900*b* illustrated in FIG. 9*b*.

At 914, a determination is made as to whether conflicting control commands are directed to the control output by the primary control program and the expansion control program. This conflict may arise, for example, if one of the two control programs sends a reset command to the output while the other of the two programs sends a set command to the output (in the case of a digital output), or if the two programs send conflicting analog values to be output via an analog output. If no conflicts occur (NO at step 914), the methodology proceeds to step 916, where the control output of the expansion module is set. Alternatively, if a conflict is detected (YES at step 914), the methodology proceeds to step 918, where a determination is made as to which program, of the primary or expansion control programs, is to be granted control priority. In some embodiments, this determination can be based on priority definitions stored on the expansion module that specify which of the two programs is to be granted priority in respective different scenarios (e.g., machine operating modes, work shifts, whether a potential safety issue is detected, etc.). At 920, the control output of the expansion module is set in accordance with the program that is granted control priority based on the determination made at step 918.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
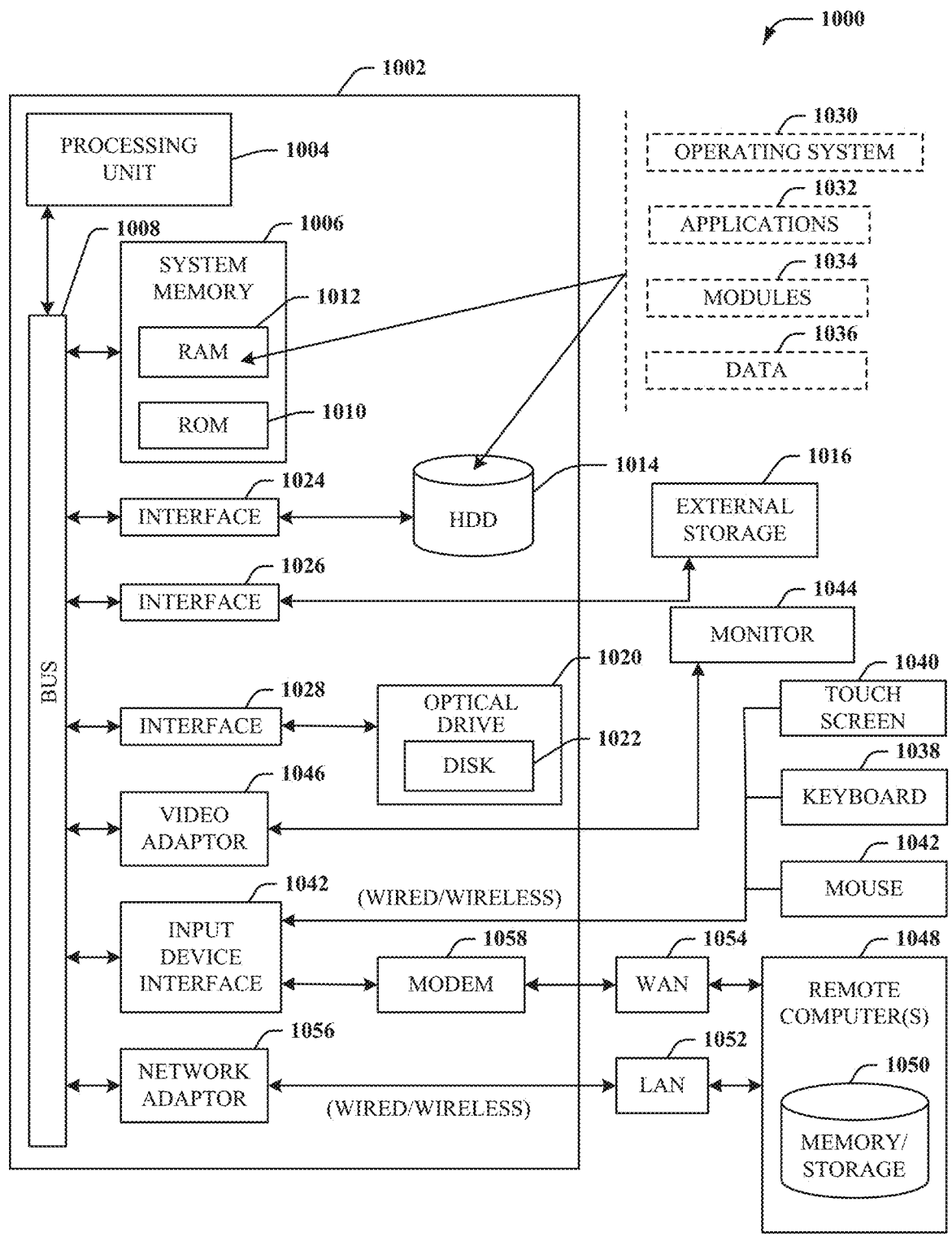
FIG. 10 is an example computing environment.
Figure 11:
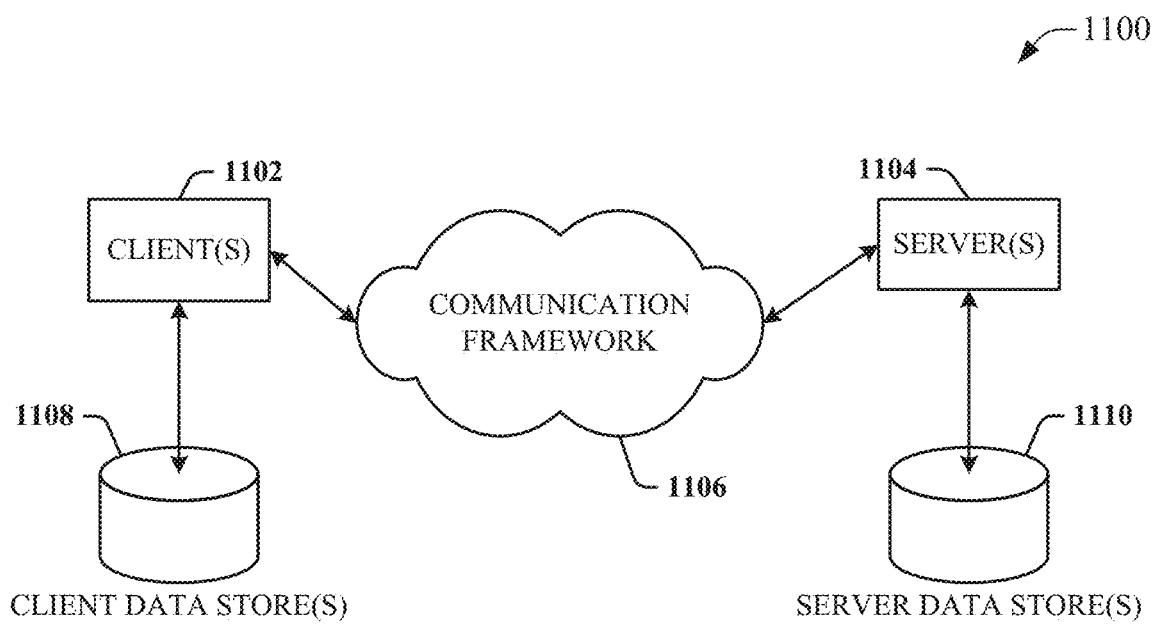
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. With reference to FIG. 10, an example environment 1010 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1048 can also encompass near field communication (NFC) or Bluetooth communication.

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An expansion module, comprising:
   a digital or analog input;
   a digital or analog output;
   a backplane interface component configured to communicatively connect the expansion module to a backplane of an industrial controller that executes a control program;
   an I/O control component configured to send a value of an input signal received by the digital or analog input to the industrial controller via the backplane interface and to set an output value of the digital or analog output in accordance with a control command from the industrial controller generated by the control program; and
   a program execution component configured to execute an expansion control program stored on a memory of the expansion module,
   wherein the I/O control component is further configured to provide the value of the input signal to the expansion control program and to set the output value of the digital or analog output in accordance with an instruction from the expansion control program.

2. The expansion module of claim 1, wherein the expansion module is configured to receive the expansion control program from the industrial controller via the backplane interface component.

3. The expansion module of claim 1, further comprising a client interface component configured to exchange data with a client device communicatively connected to the expansion module, wherein the expansion module is configured to receive the expansion control program from the client device via the client interface component.

4. The expansion module of claim 1, wherein the expansion control program is at least one of a ladder logic program, a structured text program, a sequential function chart program, or a function block diagram program.

5. The expansion module of claim 1, wherein the I/O control component is further configured to, in response to a determination that the control command from the industrial controller and the instruction from the expansion control program simultaneously attempt to set conflicting output values for the digital or analog output, assign control of the digital or analog output to a selected program of the control program or the expansion control program in accordance with a conflict resolution criterion defined on the expansion module.

6. The expansion module of claim 5, wherein the conflict resolution criterion specifies the selected program as a function of a current control context.

7. The expansion module of claim 6, wherein the current control context is at least one of a current operating mode of an automation system being monitored and controlled via the expansion module, a current safety condition, a current work shift, or a time of day.

8. The expansion module of claim 1, wherein the expansion control program is a safety handling routine.

9. A method for monitoring and controlling an industrial automation system, comprising:
   communicatively interfacing, by an expansion module comprising a processor, with an industrial controller communicatively connected to the expansion module, wherein the industrial controller executes a control program;
   executing, by the expansion module, an expansion control program stored on a memory of the expansion module;
   translating, by the expansion module, an electrical input signal received at a digital or analog input of the expansion module to yield an input value;
   sending, by the expansion module, the input value to the industrial controller for processing by the control program;
   rendering, by the expansion module, the input value accessible by the expansion control program;
   setting, by the expansion module, an output value of a digital or analog output of the expansion module in accordance with a control command received from the industrial controller generated by the control program; and
   setting, by the expansion module, the output value of the digital or analog output in accordance with an instruction from the expansion control program.

10. The method of claim 9, further comprising receiving, by the expansion module, the expansion control program from the industrial controller.

11. The method of claim 9, further comprising receiving, by the expansion module, the expansion control program from a client device communicatively connected to the expansion module.

12. The method of claim 9, wherein the executing the expansion control program comprises executing at least one of a ladder logic program, a structured text program, a sequential function chart program, or a function block diagram program.

13. The method of claim 9, further comprising:
   in response to determining that the control command received from the industrial controller and the instruction from the expansion control program simultaneously attempt to set conflicting output values for the digital or analog output, assigning, by the expansion module, control of the digital or analog output to a selected program of the control program or the expansion control program based on configuration data stored on the expansion module, wherein the configuration data that defines a conflict resolution criterion.

14. The expansion module of clam 13, wherein the conflict resolution criterion defines, for respective defined control contexts, which of the control program or the expansion control program is be designated as the selected program for the respective defined control contexts.

15. The expansion module of claim 14, wherein the control contexts comprise at least one of a current operating mode of an automation system being monitored and controlled via the expansion module, a current safety condition, a current work shift, or a time of day.

16. The expansion module of claim 9, wherein the expansion control program is a safety handling routine.

17. A non-transitory computer-readable medium having stored thereon executable instructions that, in response to execution, cause an expansion module comprising at least one processor and communicatively connected to an industrial controller to perform operations, the operations comprising:
- executing an expansion control program stored on a memory of the expansion module in parallel with execution of a primary control program that executes on the industrial controller;
- translating an electrical input signal received at a digital or analog input of the expansion module to yield an input value;
- sending the input value to the industrial controller for processing by the primary control program;
- processing the input value in accordance with the expansion control program;
- setting an output value of a digital or analog output of the expansion module in accordance with a control command received from the industrial controller and generated by the control program; and
- setting the output value of the digital or analog output in accordance with an instruction generated by the expansion control program based on the processing of the input value in accordance with the expansion control program.

18. The non-transitory computer-readable medium of claim 17, further comprising importing the expansion control program from the industrial controller.

19. The non-transitory computer-readable medium of claim 17, further comprising:
- in response to determining that the control command received from the industrial controller and the instruction generated by the expansion control program simultaneously attempt to set conflicting output values for the digital or analog output, designating control of the digital or analog output to a selected one of the control program or the expansion control program based on configuration data stored on the expansion module that defines a conflict resolution criterion.

20. The non-transitory computer-readable medium of claim 17, wherein the expansion control program is a safety handling routine.

* * * * *